United States Patent [19]
Blanco et al.

[11] 3,870,536
[45] Mar. 11, 1975

[54] CERAMIC DECALCOMANIA

[75] Inventors: Louis A. Blanco, Tuckahoe; Hazel W. Meade, Pleasantville, both of N.Y.

[73] Assignee: Commercial Decal, Inc., Mount Vernon, N.Y.

[22] Filed: Aug. 15, 1973

[21] Appl. No.: 388,375

Related U.S. Application Data

[63] Continuation-in-part of Ser. No. 110,261, Jan. 27, 1971, Pat. No. 3,772,049, which is a continuation-in-part of Ser. No. 727,649, May 8, 1968, abandoned.

[52] U.S. Cl. ............... 106/146, 106/175, 106/189, 106/191, 106/208, 106/213, 260/29.6 BE
[51] Int. Cl.. C08h 17/34, C08b 27/42, C08b 27/36
[58] Field of Search .......... 106/146, 174, 175, 185, 106/197 C, 197 R, 311; 117/3.5, 3.6; 260/29.6 BE

[56] References Cited
UNITED STATES PATENTS

| | | | |
|---|---|---|---|
| 1,924,961 | 8/1933 | Reese | 117/3.5 |
| 2,142,667 | 1/1939 | Bucy | 106/2 |
| 2,143,868 | 1/1939 | Dexheimer | 117/3.5 |
| 2,153,130 | 4/1939 | Baxter | 106/24 |
| 2,271,491 | 1/1942 | Rathke | 106/34 |
| 2,433,029 | 12/1947 | Coleman | 106/24 |
| 2,657,148 | 10/1953 | Ehrlich | 106/311 |
| 2,684,909 | 7/1954 | Leekley | 106/311 |
| 2,700,619 | 1/1955 | Sullivan | 117/3.6 |
| 3,772,049 | 11/1973 | Blanco | 106/184 |

OTHER PUBLICATIONS

Miscibility of Organic Solvent Pairs, Jackson et al, Industrial and Engineering Chem.
Chem. Abst. 52: 4072d.
Chem. Abst. 72: 31325a 1970.

*Primary Examiner*—Theodore Morris
*Attorney, Agent, or Firm*—Lerner, David, Littenberg & Samuel

[57] ABSTRACT

A bonding agent for a ceramic decalcomania comprises a balanced combination of a fast acting solvent and a moderating agent. A thickening agent may also be present. The decalcomania may be applied to the article either before or after a glaze is applied. The use of such a bonding agent for adhering a decalcomania to ceramic ware permits glaze firing without the necessity of first removing the organic material in the decalcomania and fusing the pigment to the ceramic article by prior heat treatment.

3 Claims, No Drawings

CERAMIC DECALCOMANIA

This case is a continuation-in-part of copending application U.S. Pat. Ser. No. 110,261 filed Jan. 27, 1971 now Patent No. 3,772,049 which is a continuation-in-part of application U.S. Pat. Ser. No. 727,649, filed May 8, 1968, now abandoned.

BACKGROUND OF THE INVENTION

In applying a decoration, a pattern, or an insignia to ware, it is customery to use a decalcomania comprising a number of layers. There is generally a paper backing, a layer containing the pigment in the form of the decoration and an organic layer, generally of lacquer. In applying the decalcomania to the ware, the decalcomania is first removed from the paper backing. This may be done by moistening the decalcomania and sliding the decorated portion off the paper backing. If the decalcomania is moistened with water, it is called a water mount or slide-off decalcomania. In other applications, decalcomania is moistened with solvent (in which case the decalcomania is called a solvent mount). When the paper backing is removed the organic layer maintains the design or insignia intact while transferring the decalcomania to the ware itself. In addition, the organic layer performs the additional function of protecting the design layer during transport and storage of the decalcomania and prevents deterioration or damage of the design or insignia. The organic layer is usually formed from esters or ethers of cellulose, but may be formed of other natural or synthetic film forming materials, e.g., drying oils, acrylic resins, etc.

The ceramic ware is covered with a glaze either before or after the application of the decalcomania thereto. The glaze consists of a vitreous coating which is formed directly from raw materials by firing. Where a transparent glaze is employed, an underglazed decalcomania is provided in which the glaze is applied after the decalcomania is placed on the ware. This method is widely used because the glaze thereafter acts as a protective coating over the decalcomania adding to its longevity and preventing deterioration thereof.

Failure to remove the organic layer before firing, however, coupled with improper adhesion results in imperfections in the final glazed surface. The formation of vapors and the boiling action of the organic layer tended to lift the design layer away from the article surface. Accordingly, the practice of the art has been to adhere the slide-off, water mount decalcomania to the ware by a first firing at a temperature sufficiently high to volatilize and drive off the organic coating and fuse the pigment to the ware for proper adhesion before glazing. Such a procedure called "hardening-on," is time consuming, involves additional labor and handling, and thus reduces the rate of production.

OBJECTS OF THE INVENTION

Accordingly, it is an object of the present invention to provide an improved bonding agent for adhering a decalcomania to ceramic ware, the use of which bonding agent makes it unnecessary to remove the organic layer and fuse the pigment to the ware before applying a glaze. These and other objects of the present invention will be apparent from the following description.

SUMMARY OF THE INVENTION

It has now been found that the necessity of removing the organic layer from the decalcomania and fusing the pigment to the ware, before final glaze firing the ware, may be eliminated by applying the decalcomania over a bonding agent, in accordance with the invention and then glazing and firing the ware. The bonding agent compriese a balanced combination of a fast acting solvent and a moderating agent. The fast acting solvent is selected to act on the organic material in the decalcomania. The moderating agent is selected to regulate the degree of solvency of the fast acting solvent on the organic material in the decalcomania. A thickening agent may also be present when the decalcomania is to be applied to porous ceramic ware.

DETAILED DESCRIPTION OF THE INVENTION

An agent for bonding a decalcomania to ceramic ware must satisfy a relatively large number of criteria.

1. It must have sufficient body to stay in place on the ware, particularly when applied to curved or irregular shaped surfaces. When applied to porous ware it must have sufficient body to avoid penetrating the ware.
2. It should flow smoothly when applied to the ware, e.g., when brushed on the ware.
3. It should have good covering properties, and leave no uncovered areas.
4. It must soften the organic material in the decalcomania without disfiguring or destroying the design.
5. It should not bond so quickly that the position of the decalcomania cannot be adjusted on the ware.
6. It must have sufficient solvent action to bond the decalcomania to irregular or curved surfaces.
7. It must insure adhesion of the decalcomania during glazing and firing.
8. It is preferably water soluble or water miscible so as to permit the presence of water dispersible thickening agents, and to permit cleaning of work areas without the use of organic solvents.

The nature of the solvents will depend upon the nature of the organic material in the decalcomania, the size of the decalcomania and the configuration of the ware to which the decalcomania is applied. The combination of the fast acting solvent and a moderating agent is selected to achieve proper handling and bonding properties. The fast acting solvent quickly attacks the organic material, softening it, and bringing it into close contact with the surface of the ware. By itself the fast acting solvent would attack the organic material so fast as to cause the pigment to bleed. At best this results in imperfections and disfigurations in the design, and at worst in total destruction of the design. By itself the fast acting solvent bonds the decalcomania to the ware too quickly. The bonding is so fast that adjustments in the position of the decalcomania cannot be made, and the decalcomania tends to tear when it is rubbed to remove wrinkles and bubbles. The moderating agent controls or regulates the fast acting solvent by preventing it from bonding the decalcomania to the ware too rapidly, and prevents the fast acting solvent from causing the colors in the design to run. The moderating agent enables the position of the decalcomania on the ware to be adjusted and enables it to be rubbed to remove wrinkles and bubble without tearing.

The fast acting solvent may be an ether alcohol such as lower alkyl monoether of a glycol, a monohydric alcohol, a ketone, an ester, a terpene solvent, an aromatic hydrocarbon, a nitrogen-containing heterocyclic compound or mixtures thereof.

The lower alkyl monoethers of glycols have from 2 to 8 carbon atoms in the glycol portion and the lower alkyl substituent may have up to 6 carbon atoms. Some specific examples of suitable ether alcohols are Cellosolve (2-ethoxy ethanol-1), Methyl Cellosolve (2-methoxy ethanol-1), 2-propoxy ethanol-1, Butyl Cellosolve (2-butoxy ethanol-1), hydroxy propyl Cellosolve, 2-hexoxy ethanol-1, n-butoxy propanol, 3-methoxy propanol-1, 3-ethoxy propanol-1, 3-propoxy propanol-1, 3-butoxy propanol-1, 2-methoxy propanol-1, 2-ethoxy propanol-1, 2-propoxy propanol-1, and 2-butoxy propanol-1, Carbitol (diethylene glycol monobutyl ether). The monohydric alcohol may contain up to about 6 carbon atoms and may be aliphatic, cycloaliphatic, or heterocyclic. Some specific examples of suitable alcohols are methanol, ethanol, propanol, isopropanol, butanol, isobutanol, t-butanol, amyl alcohol, cyclohexanol, and tetrahydrofurfuryl alcohol.

The ketones may be aliphatic or cycloaliphatic. Some specific examples are diacetone alcohol, acetone, methyl ethyl ketone and cyclohexanone.

Some specific examples of esters are esters of acetic acid and lactic acid such as ethylacetate, n-butyl acetate, ethyl lactate, butyl lactate, sec-butyl acetate and sec-amyl acetate.

Some specific examples of terpene solvents are alpha and beta pinene, dipentene, p-cymene, p-menthane, alpha-terpineol, and terpinolene.

Examples of aromatic hydrocarbons are Solvesso 100 and Solvesso, 150 products of Exxon Corporation, which are aromatic hydrocarbon solvents, as well as benzene, toluene and xylene.

N-methyl-2-pyrrolidone is a suitable nitrogen containing heterocyclic compound.

The moderating agent comprises a polyhydroxy compound, a secondary or tertiary terpene alcohol, for example, such as, secondary or tertiary alcohols of the above-mentioned terpene compounds, water solubilized oils, or water. Some examples of polyhydroxy compounds are compounds containing from 2 to 12 carbon atoms, such as ethylene glycol, propylene glycol, butylene glycol, pentylene glycol, trimethylolpropane, hexylene glycol, octylene or decylene glycol and dodecylene glycol. The water soluble oils are polyether derivatives of modified drying oils combined with volatile coupling agents, for example, Linaqua, a water soluable linseed oil.

Examples of suitable thickening agents include carboxy methyl cellulose, sodium carboxymethyl cellulose, hydroxyethyl cellulose, hydroxy propyl cellulose, polyvinyl alcohol, carboxy vinyl polymers, casein, acrylic resins, dextrines, gums, e.g., gum tragacanth, and gum arabic.

As was pointed out above, the bonding agent of the invention may be formulated in accordance with the nature of the organic material from which the decalcomania is constructed, the size thereof, and the nature and configuration of the ware to which it is being applied. If the thickening agent is desired it may be added in an amount varying between about 0.2% to about 10.0%, preferably from about 0.3% to about 6.0%. The fast acting solvent may be varied from about 3.0% to about 75% with from about 20% to about 70% being preferred. The moderating agent may be present in an amount varying from about 25% to about 95%, 30% to 70% being preferred. Percentages given above are by weight, based on the weight of the total composition.

In tabular form, the operable and preferred ranges are given below.

RANGES

| | Operable | Preferred |
|---|---|---|
| Fast acting solvent | 3.0% to 75.0% | 20.0% to 70.0% |
| Moderating agent | 25.0% to 95.0% | 30.0% to 70.0% |
| Thickening agent | 0.02% to 10.0% | 0.3% to 6.0% |

A preferred bonding agent of the invention includes from about 3 percent to about 75 percent of a fast-acting solvent comprising a lower alkyl monoether of a $C_2$ to $C_8$ glycol wherein the lower alkyl groups have up to about 6 carbons and from about 25 to about 95 percent of a moderating agent comprising a polyhydroxy compound selected from the group consisting of glycols containing from about 2 to about 12 carbons and mixtures thereof with water. This preferred composition may also include in admixture with the fast-acting solvent, a monohydric alcohol containing up to about 6 carbons. In addition, the above fast-acting solvent may include in addition to the ether alcohol and monohydric alcohol, a $C_2$ to $C_5$ ester of acetic acid and/or lactic acid and/or turpentine.

Furthermore, the preferred fast-acting solvent may comprise a mixture of the above type of ether alcohol and a $C_2$ to $C_5$ ester of acetic acid and/or lactic acid. Particularly preferred bonding agent compositions in accordance with the invention comprise n-butoxy propanol alone or in combination with isopropanol as a fast-acting solvent and a mixture of hexylene glycol in an amount ranging from about 14 to about 50 percent by weight of the bonding agent and water in an amount ranging from about 60.7 to about 12.5 percent by weight of the bonding agent, as a moderating agent.

Other particularly preferred bonding agents include as the fast-acting solvent a mixture of n-butoxy ethanol, diacetone alcohol and butyl lactate and as the moderating agent a mixture of hexylene glycol and water as defined above; as the fast-acting solvent a mixture of n-butoxy propanol, isopropanol and ethanol, as the moderator hexylene glycol in an amount ranging from about 14 to about 40 percent by weight of the bonding agent and water in an amount ranging from about 60.7 to about 12.5 percent by weight of the bonding agent, and containing combined therein sodium carboxy methyl cellulose as a thickening agent; as the fast-acting solvent a mixture of ethanol, n-butoxy propanol, diacetone alcohol and turpentine, as the moderating agent a mixture of hexylene glycol in an amount ranging from about 14 to about 40 percent by weight of the bonding agent and water in an amount ranging from about 60.7 to about 12.5 percent by weight of the bonding agent, and containing combined therein as a thickening agent a mixture of sodium carboxy methylcellulose and hydroxypropyl cellulose; as the fast acting solvent n-butoxy propanol, as the moderating agent a mixture of hexylene glycol in an amount ranging from about 14 to about 40 percent by weight of the bonding agent and water in an amount ranging from about 60.7 to about 12.5 percent by weight of the bonding agent, and containing combined therein a mixture of sodium carboxy methylcellulose and hydroxypropyl cellulose as a thickening agent.

Still other examples of preferred bonding agents in accordance with the invention include as the fast-acting solvent a mixture of n-butoxy propanol, ethyl lactate and amyl alcohol and as the moderating agent water, and hydroxypropyl cellulose as a thickening agent; and n-butoxy propanol as the fast-acting solvent, water as the moderating agent and hydroxypropyl cellulose as a thickening agent.

The bonding agent of the present invention is applied as a liquid to the ceramic article before the decalcomania is affixed thereto. The manner of applying the bonding adhesive is not critical. It may be applied in any convenient manner. Surface coating methods of applying the bonding agent, for example, brushing, dipping, spraying, wiping, etc., are suitable. The bonding adhesive should be applied in the form of a substantially continuous layer. Once the bonding agent has been applied to the ware, the decalcomania without its paper backing is transferred onto the wet bonding agent. The solvents then attack the organic material and bond the decalcomania to the ware as it is brought in firm contact with the ware. At this point, in conventional practice, the lacquer layer would be removed and the pigment bonded to the ware, or hardened on the ware, for example, by firing the ware at low temperatures for an extended period of time. In accordance with the present invention, however, such a step is unnecessary and the bonding agent with the decalcomania applied thereon is ready to be glazed.

The bonding agent of the present invention may be applied directly to the ware in liquid form before positioning the decalcomania on the ware, or it may be applied to the ware along with the decalcomania for example, by adding the bonding agent to the liquid used to moisten the decalcomania to remove the backing, or by dipping the decalcomania in the bonding agent after removing the backing.

The bonding agent of the present invention forms an intimate bond between the decalcomania and the ware. It adheres the design as firmly to the ware as if it had been printed directly to the ware instead of from a decalcomania.

The bonding agent of the present invention can also be used to adhere decalcomanias to greenware, or to the unfired or raw glaze applied to green ware or bisque ware. Green ware is unfired clay. The decalcomania is adhered directly to the green ware by the bonding agent. The ware is then fired, a glaze is then applied to the ware and the glaze fired. In order to eliminate the separate glaze firing step, the green ware may first be glazed and the decalcomania applied over the glaze or the decalcomania may be applied before the glaze. Then the ware and glaze are fired and the decalcomania fused in one operation. With the bonding agent of the present invention, the decalcomania may similarly be bonded to bisque ware either before or after the glaze is applied.

Use of the bonding agent of the present invention avoids the necessity of low temperature firing to remove a layer of organic material and bond the pigment to the ware and thus eliminates steps which had heretofore been necessary and greatly reduces the time and labor required for applying the decalcomania and glazing the ceramic article.

The following examples illustrate typical formulations of the bonding adhesive of the present invention. Unless otherwise indicated, all parts are expressed in parts by weight.

| FAST ACTING SOLVENTS: Example Number | 1 | 2 | 3 | 4 | 5 | 6 | 7 |
|---|---|---|---|---|---|---|---|
| Turpentine | 30.0 | | | | | | |
| Toluene | | 30.0 | | | | | |
| n-butoxy propanol | | | | 25.0 | | 20.00 | 3.80 |
| Solvesso 100 | | | 30.0 | | | | |
| Isopropanol | | | | | 25.0 | | |
| Butyl Cellosolve | | | | | 20.0 | | |
| Diacetone Alcohol | | | | | 4.0 | | |
| Butyl Lactate | | | | | 4.0 | | |
| Ethanol | | | | | | 0.50 | |
| Ethyl Lactate | | | | | | | |
| Amyl Alcohol | | | | | | | |
| MODERATING AGENTS: | | | | | | | |
| Hexylene Glycol | 70.0 | 70.0 | 70.0 | 37.5 | 40.0 | 30.00 | 40.0 |
| Water | | | | 12.5 | 32.0 | 29.47 | 50.4 |
| THICKENING AGENTS: | | | | | | | |
| Carboxy methyl cellulose | | | | | | | 1.6 |
| Hydroxy propyl cellulose | | | | | | | 4.2 |
| Sodium carboxy methyl cellulose | | | | | | 0.03 | |
| TOTAL | 100 | 100.0 | 100.0 | 100.0 | 100.0 | 100.0 | 100.0 |

| 8 | 9 | 10 | 11 | 12 | 13 | 14 | 15 | 16 | 17 |
|---|---|---|---|---|---|---|---|---|---|
| 14.0 | | | | | | | | | |
| 2.4 | 11.75 | 25.00 | 47.50 | 57.00 | 66.50 | 7.65 | 43.87 | 52.64 | 61.42 |
| | 11.75 | 25.00 | | | | | | | |
| 5.0 | | | | | | | | | |
| 0.8 | 1.31 | | | | | | 4.38 | 5.26 | 6.13 |
| | | | | | | | 0.25 | 0.30 | 0.35 |
| 14.0 | 17.65 | 37.50 | | | | 40.35 | | | |
| 60.7 | 57.16 | 12.50 | 50.00 | 40.00 | 30.00 | 50.05 | 50.00 | 40.00 | 30.00 |
| 2.6 | 0.38 | | 2.50 | 3.00 | 3.50 | 0.40 | 1.50 | 1.80 | 2.10 |
| | | | | | | 1.55 | | | |
| 100.0 | 100.0 | 100.0 | 100.0 | 100.0 | 100.0 | 100.0 | 100.0 | 100.0 | 100.0 |

The bonding adhesives of the foregoing examples were coated on ceramic plates. After removing the paper backing from the decalcomanias by soaking in water, each consisting of a backing, pigment layer and lacquer film, the decalcomanias were placed on the plates over the bonding adhesive. Some of the decalcomanias were applied with the pigment layer next to the adhesive and the lacquer film on top, and others were applied with the lacquer film next to the adhesive and the pigment layer on top. The plates were then subjected to a glazing operation and fired without any initial firing to volatilize and drive off the organic material, and fuse the pigment to the plate. After the glazing and firing operations were completed, the plates were inspected. No imperfections were found in the design, nor was any separation from the plate detected.

Use of the bonding agent of the invention eliminates the necessity of an initial firing process to remove the organic material and to fuse the pigment to the plate, and the handling and labor involved in inserting the ware in and removing it from the initial firing kiln.

It will be understood that the foregoing description with the details of exemplary structure is not to be construed in any way to limit the invention, but that modification may be made thereto without departing from the scope of the invention as set forth in the following claims.

What is claimed is:

1. A bonding agent for ceramic decalcomanias, the decalcomania containing a pigment and an organic material, said bonding agent consisting essentially of from about 20 to about 70% of a fast-acting solvent selected to act on the organic material in the decalcomania, said fast-acting solvent being a lower alkyl monoether of a $C_2$ to $C_8$ glycol wherein the lower alkyl groups have up to about six carbons, a monohydride alcohol containing up to about six carbons, a $C_2$ to $C_5$ ester of acetic acid and/or lactic acid, in admixture with turpentine, and from about 30 to about 70% of a moderating agent selected to moderate the action of the solvent on the organic material, and selected from the group consisting of propylene glycol, butylene glycol, pentylene glycol, hexylene glycol, octylene glycol, decylene glycol, and dodecylene glycol and mixtures thereof and mixtures of one or more thereof with water.

2. A bonding agent according to claim 1 which includes from about 0.02 percent to about 10.0 percent of a thickening agent selected from the group consisting of methylcellulose, polyvinyl alcohol, casein, sodium carboxy methylcellulose, hydroxypropyl cellulose, dextrines, and gums selected from the group consisting of gum tragacanth and gum arabic and mixtures thereof.

3. A bonding agent for ceramic decalcomanias, the decalcomania containing a pigment and an organic material, said bonding agent consisting essentially of from about 20 to about 70% of a fast-acting solvent consisting essentially of terpene solvents selected from the group consisting of alpha and/or beta-pinene, dipentene, p-cymene, p-menthane and terpinolene and mixtures of one or more thereof with a member selected from the group consisting of monohydric alcohols containing up to about 6 carbons, lower alkyl monoethers of $C_2$ to $C_8$ glycols wherein the lower alkyl groups have up to about 6 carbons, aliphatic or cyclo-aliphatic ketones containing 3 to 6 carbons, $C_2$ to $C_5$ esters of acetic acid and/or lactic acid, monocyclic aromatic hydrocarbons, alpha-terpineol, and turpentine;

and from about 30 to about 70% of a moderating agent selected to moderate the action of the solvent on the organic material, said moderating agent being selected from the group consisting of secondary or tertiary terpene alcohols of terpenes selected from the group consisting of alpha and beta-pinene, dipentene, p-cymene, p-menthane, and terpinolene; glycol compounds selected from the group consisting of propylene glycol, butylene glycol, pentylene glycol, hexylene glycol, octylene glycol, decylene glycol, and dodecylene glycol, and mixtures thereof, and mixtures of one or more thereof with water which further includes from about 0.02 percent to about 10.0 percent of a thickening agent selected from the group consisting of methylcellulose, poly vinyl alcohol, casein, sodium carboxy methylcellulose, hydroxypropyl cellulose, dextrine, and gums selected from the group consisting of gum tragacanth and gum arabic, and mixtures thereof.

* * * * *